May 1, 1945.  V. W. LINDSTEIN  2,374,760
CALCULATING MACHINE
Filed April 22, 1940  10 Sheets-Sheet 3
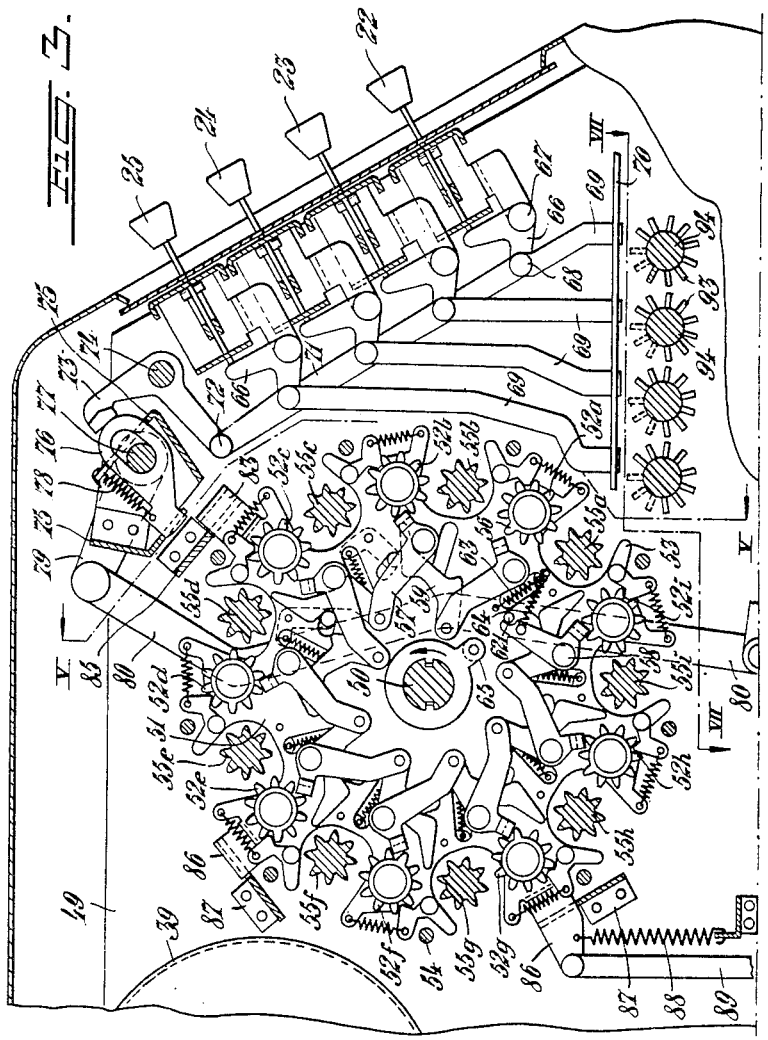
Inventor
Vigo W. Lindstein
by Sommers & Young
Attorneys

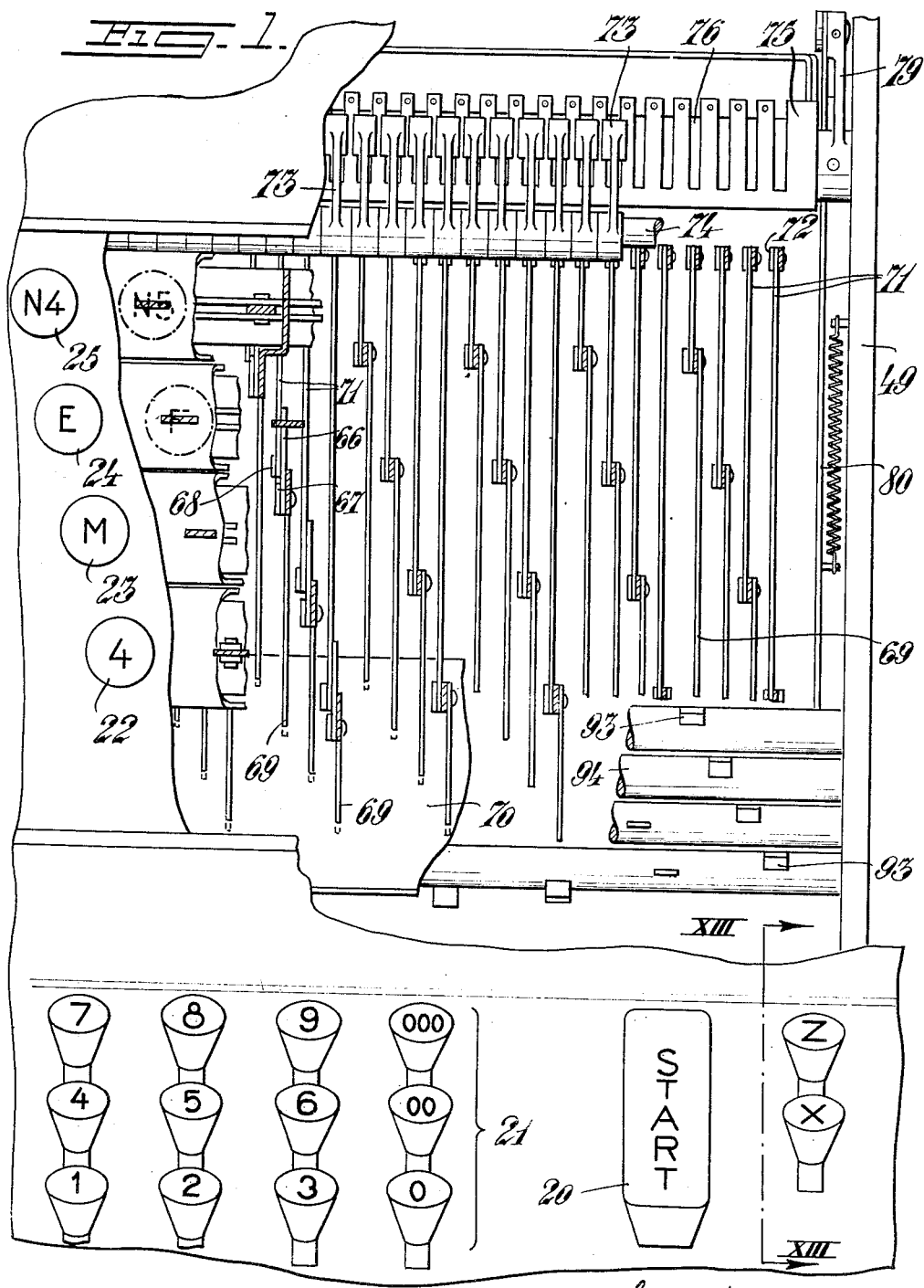

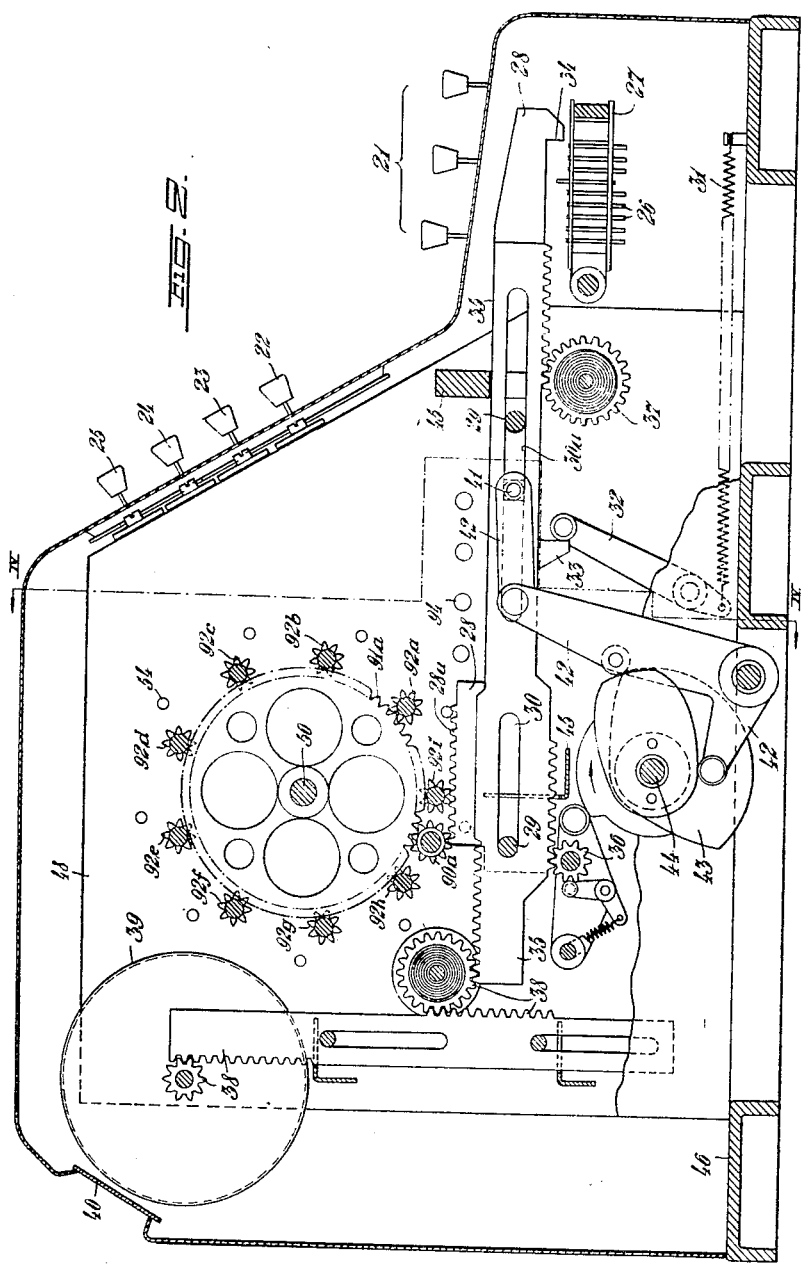

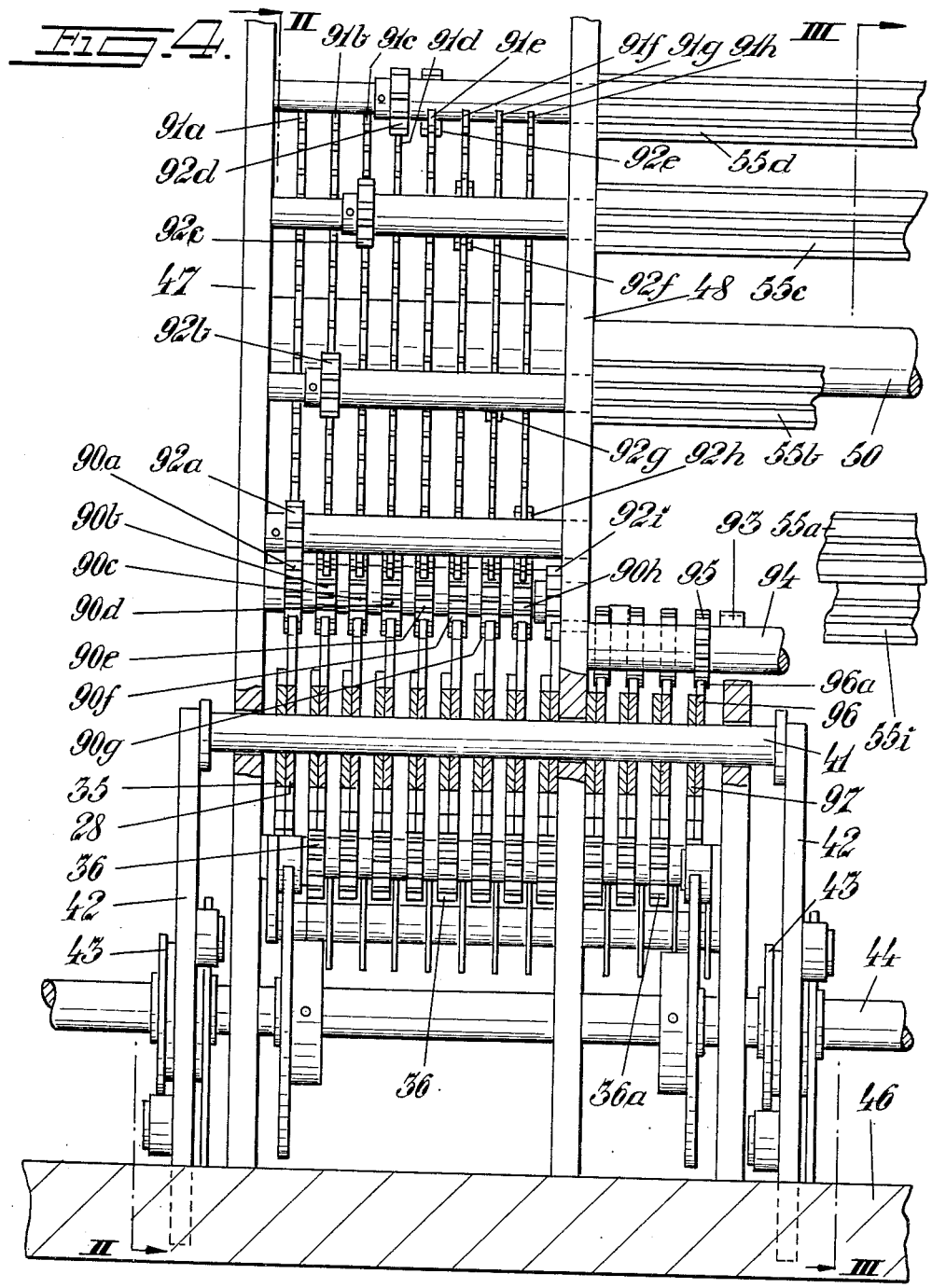

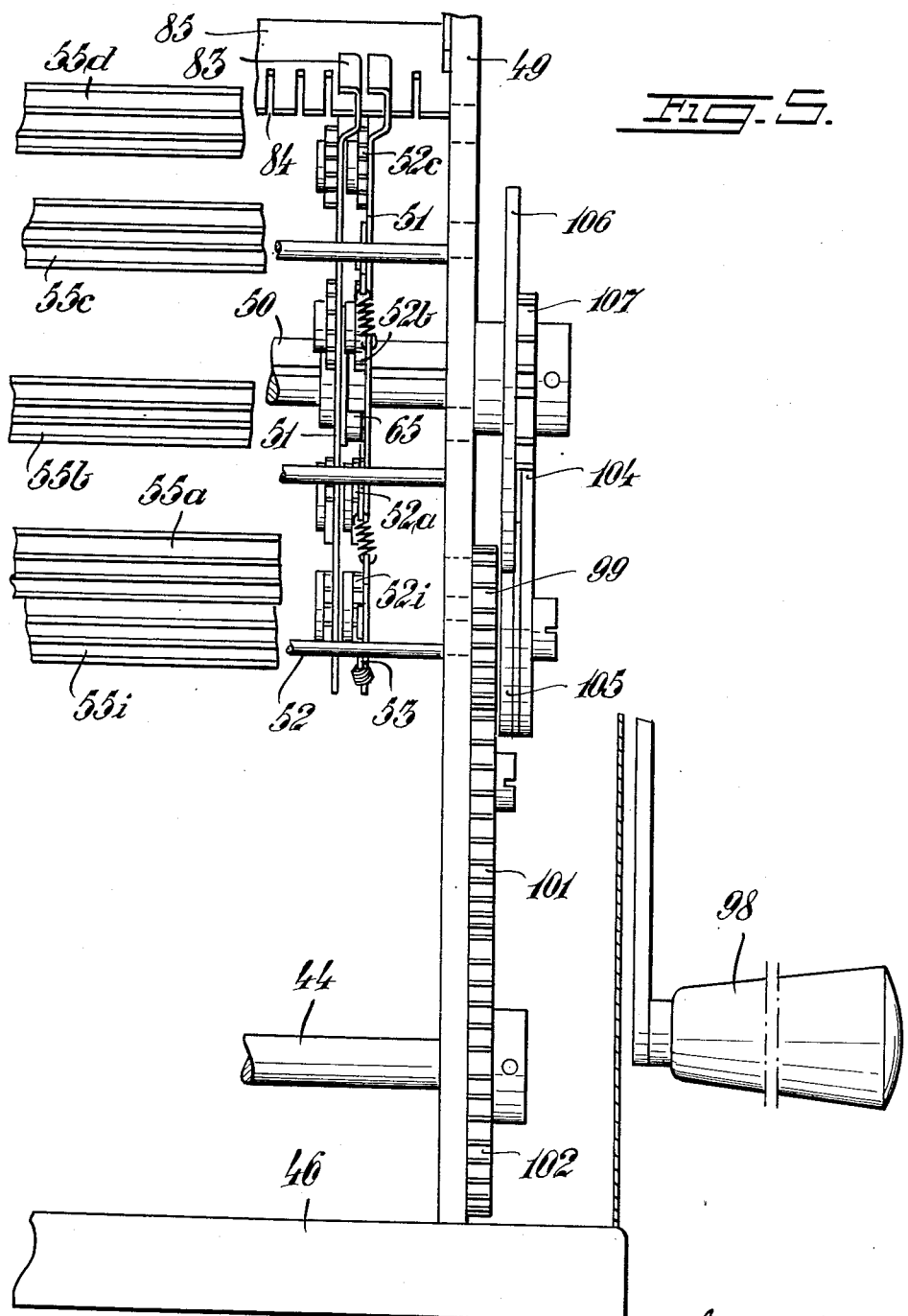

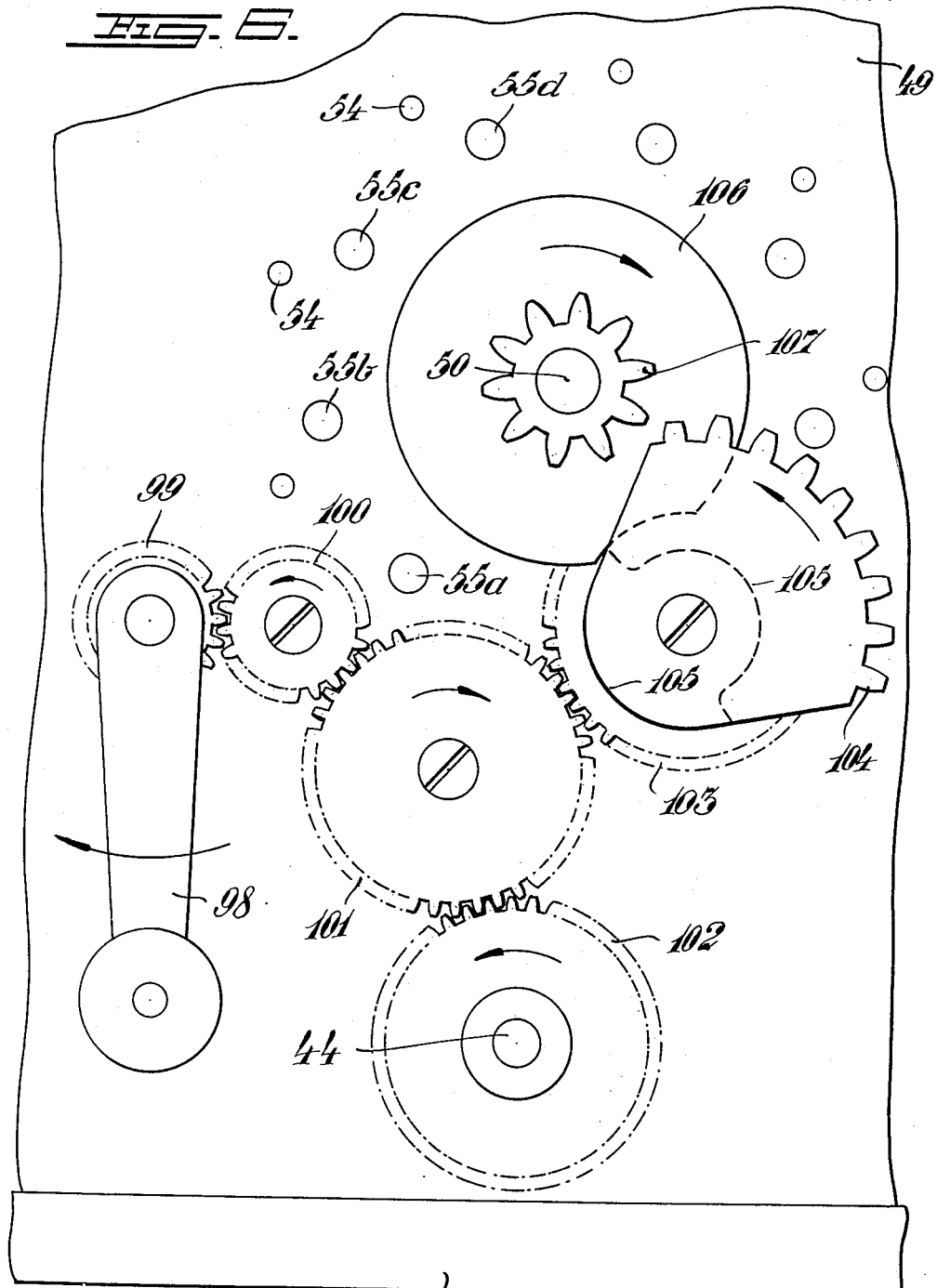

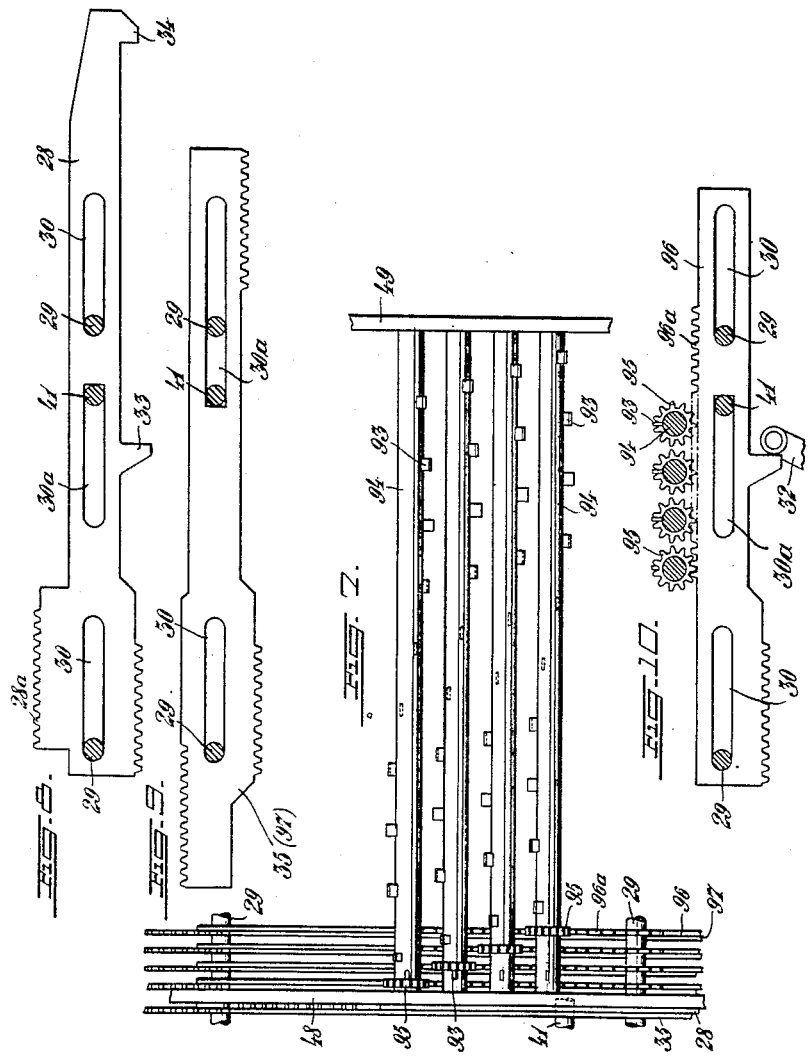

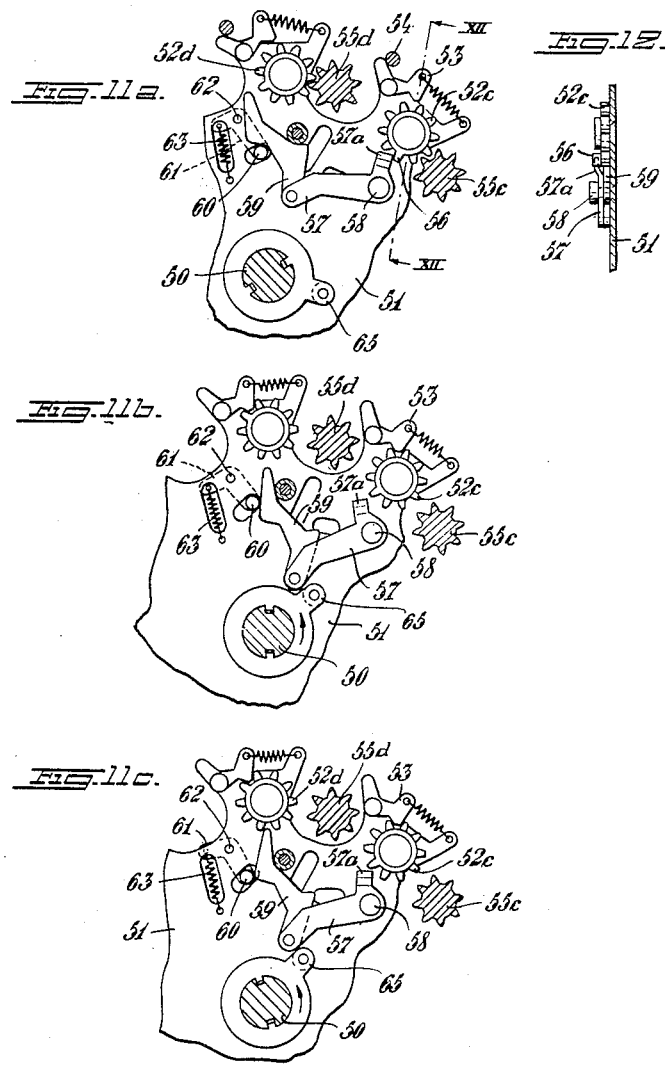

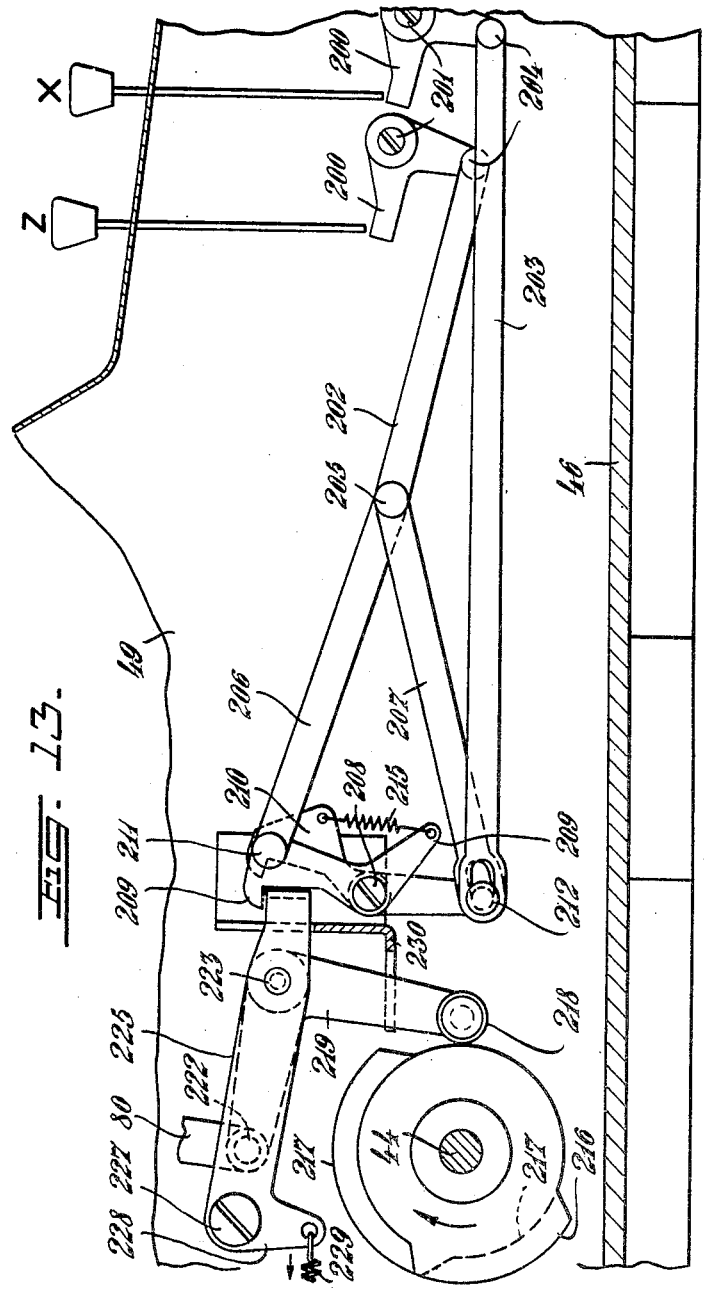

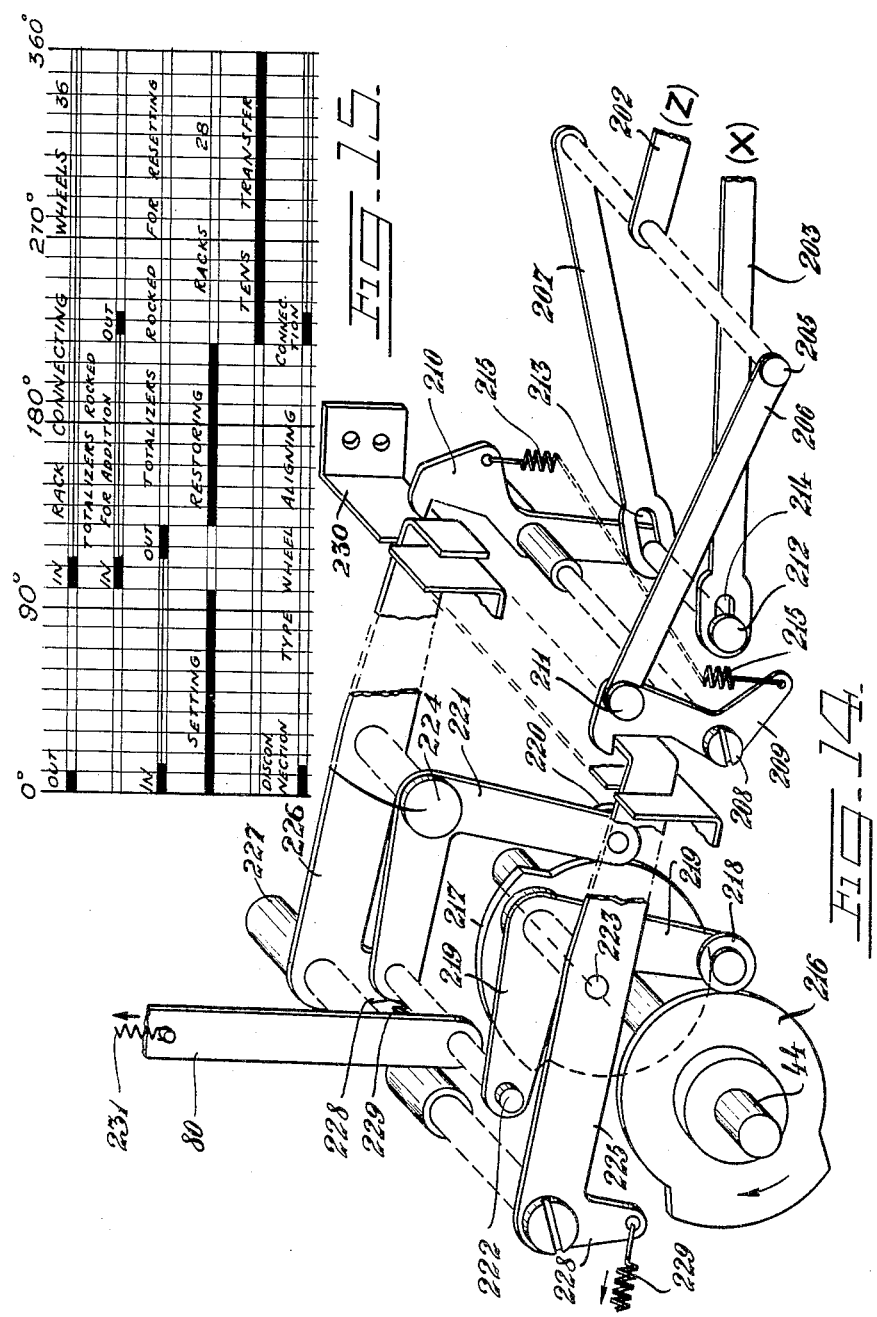

Patented May 1, 1945

2,374,760

UNITED STATES PATENT OFFICE 2,374,760

CALCULATING MACHINE

Vigo Waldemar Lindstein, Stockholm, Sweden, assignor to Svenska Kassaregisteraktiebolaget, Stockholm, Sweden, a joint-stock company of Sweden Application April 22, 1940, Serial No. 331,056
In Germany April 22, 1939

1 Claim. (Cl. 235—138)

The invention relates to cash registers, calculating machines and the like.

The chief purpose of this invention is to render it possible to arrange a great number of totalizers in a machine having small external dimensions.

Another object of this invention is to create a machine of this type which is simple, reliable, compact and capable of withstanding rough handling.

Another object of this invention is to render it possible to build a machine of this type at a low cost, even with a great number of totalizers.

Another object of this invention is to render it possible to control the operation of the machine by means of a minimum number of keys.

Another object of this invention is to select the totalizers directly by means of keys, before the operation of the machine.

Other objects of the invention will be evident from the following specification and claim.

One embodiment of the invention is illustrated in the annexed drawings.

Fig. 1 shows a partial front view of a cash register in accordance with this invention, some parts being broken away to show the parts below.

Fig. 2 is a cross section, substantially on the line II—II in Fig. 4.

Fig. 3 shows a partial section on the line III—III in Fig. 4.

Fig. 4 shows a vertical section on the broken line IV—IV in Fig. 2, all totalizers being removed from the sake of clearness.

Fig. 5 is a partial section on the line V—V in Fig. 3 and shows a front view of two totalizer disks together with adjacent parts.

Fig. 6 is an end view from the right in Fig. 5.

Fig. 7 shows a plan view of the members transmitting motion from the totalizer selecting keys to the sign setting racks.

Fig. 8 shows an amount setting rack.

Fig. 9 shows an amount indicator rack.

Fig. 10 is a partial view of a sign setting rack together with toothed wheels for transmitting motion from the totalizer selecting keys to the sign setting racks.

Figs. 11a, 11b and 11c show a part of the tens transfer mechanism in different positions. Fig. 11a shows this mechanism in its position of rest just before the beginning of the tens transfer. Fig. 11b shows the mechanism after the initiation of a tens transfer, while Fig. 11c illustrates the completion of the tens transfer. Certain parts are broken away in Figs. 11a–c.

Fig. 12 is a partial section on the line XII—XII in Fig. 11a.

Fig. 13 is a section on the line XIII—XIII in Fig. 1 and illustrates the mechanism for setting the kind of operation.

Fig. 14 is a perspective view of the most important parts of the mechanism for setting the kind of operation, the parts being cut and drawn away from each other to illustrate their shape and relative positions.

Fig. 15 is a timing diagram of the operation of the machine.

Figs. 3, 11a—c and 12—14 are on larger scales than the other figures.

As usual, to render the figures more clear, in certain figures only those parts are shown, which are in or adjacent to the plane of section while more remote parts have been broken away. To further increase the clearness additional parts have been broken away in some figures.

The cash register illustrated as an example in the drawings has forty totalizers, though a smaller or greater number may be used in accordance with the invention. The cash register as illustrated has ten totalizers for ten salesmen or the like (for instance waiters), twenty totalizers for twenty different kinds of goods and ten totalizers for printing bills for the ten salesmen. The invention is not limited to any special number of totalizers or to any special purpose for such totalizers. In the embodiment shown each totalizer has nine denominations, that is, nine numeral wheels. Thus the maximum amount to be registered in each totalizer is 9,999,999.99. This is only by way of example.

The invention may obviously be applied also to machines of another capacity, another number of totalizers, any desired number of kinds of operation and with or without multiple items totalizers. It may also be applied to non-decimal machines (for instance machines in accordance with the British coinage) and to calculating or accounting machines, and the like.

Keyboards

Fig. 1 shows the two keyboards.

The machine has a start key 20 both for manually driven machines and for machines with a motor. This key has to be depressed, before the machine can be started by means of a crank, such as 98 (or a motor). The amount setting keyboard 21 is constructed on the ten-key principle, having additional keys for "00" and "000". There are also two kinds of operation keys Z for clearing or resetting and X for reading.

The upper keyboard has four rows of keys 22, 23, 24, 25, each comprising ten keys. The ten keys 22 are marked with the numbers "1, 2, 3 . . . 9, 10" and are for ten waiters with these numbers. In the rows 23, 24 the keys are marked with letters, the keys 23 being, for instance, for various kinds of food, tobacco or the like, while the keys 24 are for ten different sorts of wines and liquors. The ten keys 25 carry the sign "N1, N2, . . . N9, N10" and are also for the ten waiters, each waiter using that key 25, which carries his number.

The keys 22, 23, 24 are used for delivering control slips ("bons") which the waiter takes from the cash register and hands over to a controller when he receives goods (food, wine, liquor etc.) at a bar, to serve them to the customers or guests. The waiter uses his key 25, when he shall have his bill stamped with a receipt in the cash register, to receive money from the customers. This renders a full control of the payments possible.

The general operation of the machine is as follows:

To get his control slips, the waiter depresses those keys 21 which correspond to the amount desired (for a certain kind of goods), presses down his waiter key 22 and a goods key 23 or 24. At the operation of the machine he then receives a control slip showing the amount, the number of the waiter and the sign of the kind of goods. This amount is registered both in the waiter's totalizer and in the totalizer for the particular kind of goods. (The machine automatically sets itself to addition, when no kind of operation key has been depressed.)

When a customer pays, the procedure is analogous, but the waiter then does not depress his waiter key 22 but only the amount keys 21 and his bill key 25. At this operation the amount is registered only in the waiter's bill totalizer.

It should be mentioned that in this specification the words "left," "right," "backwards," "forwards" and "lateral" indicate directions and positions as they are to an operator sitting in front of the machine to manipulate the keyboards in the ordinary way.

Setting the amounts

The amount keys 21, when depressed, act on stop pins 26 (Fig. 2) of a carriage 27, which for each depression of a key moves one step (from the left to the right in Fig. 1) in well known manner. Thus, the carriage is moved into the paths of amount setting racks 28 (Figs. 2, 4, 8), one for each denomination of the totalizers. Thus, in the embodiment shown nine such racks are provided. When, for instance, the amount or item set by means of the keys 21 has four denominations (figures), the carriage 27 moves four steps so that the amount setting racks 28 of the four lowest denominations then cooperate with the carriage. In other words, the four racks 28 to the extreme left of Fig. 4 then cooperate with the carriage. Because at this setting operation the carriage moves from the left to the right in Fig. 1, the extreme left rack 28 is for the lowest denomination (ones) and the extreme right rack is for the highest denomination (hundred millions). It is to be observed that when the key marked "00" is depressed, the carriage moves two steps, while it moves three steps upon the depression of the key "000"; and when the amount key "9" is depressed, no pin 26 is set, but the rack 28 is stopped by fixed stops. The carriage 27 and the racks 28 are substantially of the conventional construction used in adding machines.

Stationary rods 29 pass through slots 30 of the racks 28 to guide them to a rectilinear motion. At the operation of the machine, these racks are moved to the left in Fig. 2 by means of springs 31, which act on shoulders 33 of the racks by means of levers 32, until the racks are stopped by striking the pins 26 set (when the amount key "9" has been depressed, the racks are stopped, when the ends of the slots 30 strike the rods 29). This motion of the rack corresponds to the value of the amount key depressed for that denomination.

After the racks 28 have thus been brought to a standstill, each of them is in well-known manner (British Patent No. 378,931; see also our U. S. patent application Ser. No. 140,520) coupled with its amount indicator rack 35 by means of toothed wheels 36. At this moment these amount indicator racks are in their zero position and consequently, at the return motion of the racks 28, the racks 35 are moved as many steps as corresponds to the value of the amount key depressed for the denomination in question. The motion of the racks 35 is transmitted by transmissions 37 to the printing mechanism and also by transmissions 38 to amount indicator wheels 39, which are visible in a window 40. The printing mechanism may be of well-known construction; it is not claimed nor shown here.

For restoring the racks 28 back (to the right in Fig. 2) to their position of rest a restoring rod 41 is provided, which is reciprocated by an arm-and-lever-system 42 from a cam disk 43 on the main driving shaft 44 of the machine. The rod 41 extends through slots 30a in the racks 28, 35.

At the beginning of the next operation of the machine, the toothed wheels 36 are disconnected from the racks 28, 35, and then the racks 35 are restored (to the left in Fig. 2) to their position of rest by the restoring rod 41 which in its motion strikes the left-hand ends of these slots 30a in said racks 35 through which said rod extends. Later in the same operation of the machine the racks 28 are restored by the same rod 41, which then in its motion strikes the right-hand ends of these slots 30a in said racks 28 through which said rod extends, as just described.

In the lateral direction the racks 28, 35 are guided by slots in rails 45.

Totalizers

The stationary frame of the machine consists substantially of a bottom plate 46 and three vertical walls 47, 48, 49. In the walls 48, 49 a shaft 50 is rotatably journalled which carries a number of disks 51 (Figs. 3 and 5) rotatable in relation to said shaft. On pins secured to said disks totalizer wheels 52a—i are rotatably journaled, nine for each disk. The nine totalizer wheels 52a—i on one and the same disk constitute together a totalizer of nine denominations, 52a being the ones wheel, 52b the tens wheel, 52c the hundreds wheel etc. The wheels 52a—i are normally under the action of spring-pressed catches or pawls 53. When a disk 51 is rotated clockwise in Fig. 3, the pawls 53 strike stationary rods 54 and are thus disconnected from the totalizer wheels, as illustrated in Fig. 11a. This clockwise rotation of the disk 51 causes the totalizer wheels 52a—i to engage toothed cylinders 55a—i, respectively, said cylinders being rotatably journalled between the end walls 48 and 49 (see also Fig. 4). But when the disk 51 afterwards is rotated back counterclockwise, the wheels 52a—i are disconnected from the toothed cylinders 55a—i and simultaneously the catches 53 again engage their totalizer wheels.

How the disks 51 are rotated is described below under the heading "Totalizer selection."

Tens transfer

The totalizer wheels 52a—i each have one tens transfer tooth 56, which is broader than the other teeth of these wheels (Figs. 11a–c and 12). In the path of motion of each tens transfer tooth 56 a lever 57 is arranged, rotatable on a pin 58 on the disk 51. Close by the corresponding totalizer wheel the lever 57 has a Z-shaped bent portion 57a, below which the normal teeth of the wheels 52a—i but not the tens transfer tooth 56 can pass. Each time when the tens transfer tooth 56 in normal calculating operations (addition) strikes the part 57a, the tooth 56 rotates the lever 57 so that a tens transfer is initiated (prepared). The lever 57 is articulately connected with a transfer arm 59 which on one side is guided against the pin 58 (or a roller thereon) of the next higher denomination and on its other side is guided by a movable pin 60. This pin passes through a slot in the disk 51 and is secured to a lever 61, which is arranged on the opposite side of the disk and rotatable on a pin 62 secured to the disk 51. A spring 63 presses the pin 61 against the edge of the lever 59.

It is to be observed that the lever 57 of the totalizer wheel 52i of the highest denomination has no transfer arm 59 and consequently does not carry out any tens transfer. It is pressed by a spring 64 against an adjacent pin 62i on the disk 51 (Fig. 3).

To the shaft 50 rings or hubs with a projection 65 are secured, one for each totalizer disk 51. When the shaft 50 is rotated counterclockwise, the projection 65 consecutively (beginning with the lowest denomination) strikes those of the levers 57, which have been rocked into the path of motion of the projection 65 due to the fact that for these denominations a tens transfer has been initiated.

Fig. 11a shows the tens transfer mechanism in its position of rest. When during the calculation a totalizer wheel (say 52c) passes from the value "9" to the value "0" in one or more denominations (say for instance 52c), the tens transfer tooth 56 rocks the lever 57 to the position shown in Fig. 11b so that a tens transfer is initiated. At the tens transfer proper, which is carried out after the totalizer wheels 52a—i have been disengaged from the toothed cylinders 55a—i, the projection 65 moves the transfer arm 59 obliquely outwards so that the outer point or top of this arm engages the totalizer wheel (52d) of the next higher denomination and rotates it one step, as shown in Fig. 11c. This causes the part 57a to enter the path of motion of the tens transfer tooth 56 again, and the tens transfer is completed and the tens transfer mechanism ready for a new tens transfer. Reverse rotation of the totalizer wheels by the transfer pawls in the course of item entry is prevented by actuators 55, with which the wheels are engaged; however, if transfer conditioning occurs after item entry is completed, due to carry on a carry, reverse rotation of the totalizer wheels is prevented by pawls 53, now engaging said wheels.

The tens transfer is effected consecutively from the lowest denomination (at 52a) to the highest one (at 52i). If the totalizer wheel, to which tens are transferred, itself is then rotated from the value "9" to the value "0," a further tens transfer to the next higher denomination is initiated.

Totalizer selection

Each of the forty totalizer disks 51 is operatively connected with a corresponding key in the rows 22—25 in such manner that when one of these keys (totalizer selection keys) is depressed the corresponding totalizer is selected.

For this purpose the lower (inner) ends of the shafts of the keys 22—25 act directly on one arm of corresponding bell crank levers 66 (Figs. 1 and 3). These levers are rotatably journalled on stationary pins 67 in the key banks and the other arms of the levers are articulately connected by means of pins 68 with rods 69, respectively. The rods 69 are guided substantially to a rectilinear motion in slots in a stationary plate 70 and are articulately connected with their respective links 71. Each of the links 71 is connected with its bell crank lever 73 by means of a pin 72, the levers 73 being hammer-shaped and rotatably journalled on a stationary shaft 74. When a key in the rows 22—25 is depressed, both its rod 69 and its lever or hammer 73 are actuated.

A laterally extending trough-like rail 75 has a number of guiding slots, in which slides 76 are displaceably journalled, one for each totalizer. The slides 76 are guided to rectilinear motion in relation to the rail by the said guiding slots and also by a shaft 77, passing through slots in the slides and secured to the walls 48, 49. Each slide 76 has a restoring spring 78.

At the operation of the machine the rail 75 is rocked like a cradle on the shaft 77 by a lever 79 rigidly secured to the rail. The lever 79 is actuated from the main driving shaft 44 via a rod 80 and cam disks 216, 217 (Fig. 13) on said shaft 44, as is described below under the heading "Setting the kind of operation." For that or those totalizer disks 51 which have been selected by depressing one or more corresponding keys in the rows 22—25, the corresponding slide 76 is pressed down from its position shown in Fig. 3; and when the rail 75 is rocked, each slide 76 thus pressed down strikes a projection 83 of the corresponding totalizer disk 51 and thus rocks this disk clockwise in Fig. 3, until the totalizer wheels 52a—i of that disk engage their toothed cylinders 55a—i and the catches 53 are rocked to inoperative position by striking the rods 54, as described above.

Close by the projections 83 the disks 51 are guided in slits in a stationary rail 85 (Fig. 5) extending laterally. The disks also have other projections 86 guided in slits in stationary rails 87 (Fig. 3), and a tension spring 88 between the disk 51 and a stationary bracket rocks the disk 51 back again to strike the bottom of the guiding slits in the rails 85, 87, after the calculating (items entering) operation proper is finished, but before the tens transfer is effected. A rod 89 is connected articulately with one of the projections 86 and serves to actuate a cash drawer releaser corresponding to the totalizer disk and its key. As a rule, rods 89 are only provided for those ten totalizer disks 51 which correspond to the bill keys 25.

When a key is depressed in one of the rows 22—25, its corresponding slide 76 is immediately depressed by the key (via the intermediate members 66, 71, 73) and at the following operation of the machine each slide thus depressed engages the corresponding totalizer with the toothed cylinders 55a—i, which actuate the totalizers. Consequently, the selection of the totalizers is effected directly by means of the keys 22—25, when the machine stands still (does not rotate), and that or those totalizers which have been selected, are consequently engaged and moved to operative position during the operation of the machine.

*Totalizer engaging mechanism*

The amount setting racks 28 have rows of teeth 28a on their upper side, each in permanent mesh with toothed wheels 90a—h, 92i (Figs. 2 and 4), respectively. The toothed wheel 92i is secured to the shaft of the toothed cylinder 51i so that said cylinder is directly driven by its rack 28. The toothed wheels 90a—h are in permanent mesh with toothed disks 91a—h, respectively, said disks meshing permanently with one toothed wheel 92a—h each. Those wheels 92a—h are secured to the shafts of their toothed cylinders 55a—h. As is best seen shown in Fig. 4, the wheels 92a—i are set off or displaced axially in relation to each other. Each amount setting rack 28 thus permanently rotates its respective toothed cylinder 52a—i so many steps, as corresponds to the motion of the rack 28, that is (for addition) to the value of the amount key depressed for that denomination.

It is to be observed that for the parts 52a—i, 55a—i, 90a—h, 91a—h and 92a—i, the index a always indicates the lowest denomination (ones), b the next higher denomination (tens), etc.

As described above under the heading "Setting the amounts," at the operation of the machine the amount setting racks 28 are first moved a number of steps to the left in Fig. 2 in dependence on the values of the respective amount keys 21 depressed. This causes the corresponding toothed cylinders 55a—i to rotate clockwise in Fig. 3, but during this rotation the totalizer wheels 52a—i are in the position shown in Fig. 3 and consequently are disengaged from the toothed cylinders 55a—i. When the racks 28 have finished their motions to the left in Fig. 2, one or more disks 51 are rocked (by means of the rods 80) to bring the totalizer wheels to engage or mesh with the toothed cylinders 55a—i. The wheels 52a—i are then rotated a number of steps in accordance with the setting of their respective racks 28, when the racks 28 are restored to their zero position (to the right in Fig. 2) and consequently rotate the toothed cylinder counter-clockwise in Fig. 3. When the racks 28 stop in their zero position, the rod 80 rocks the disk 51 counter-clockwise so that the totalizer wheels 52a—i are disengaged from said toothed cylinders, whereupon the tens transfer is effected, as described above.

The item set in the stop pin carriage 27 by means of the amount keys 21 is consequently now entered into (registered in) that or those totalizers, which have been selected for engaging the toothed cylinders 55a—i at the operation of the machine, by manual depression of one or more keys in the rows 22—25.

Before the amount setting racks are restored to their zero position, they are coupled to their amount indicator racks 35 by means of the toothed wheels 36, the racks 35 being in their zero position at that time. When the racks 28 are restored to their zero position, the indicator racks 35 are consequently moved so many steps, as their respective setting racks 28 are moved; and via the transmission 38 the value set for each denomination is indicated on the corresponding amount indicator wheel 39.

*Indication of selected totalizers*

When a totalizer selecting key is depressed in one of the rows 22—25, its rod 29 is displaced downwards in Fig. 3. The lower end (which in certain rods must be bevelled) of the rod 69 then enters the path of motion of a corresponding projection or flap 93 (Figs. 1, 2 and 3). The projections 93 are arranged along helical lines on shafts 94, which are rotatably journalled in the walls 48, 49. To each of the shafts 94 a toothed wheel 95 is secured; and the wheels 95 are displaced axially in relation to each other and in permanent mesh with the upper toothed edges 96a of sign indicator racks 96 (Figs. 4, 7 and 10). Four racks 96 are provided, one for each of the key rows 22—25, and these racks are guided to rectilinear motion and actuated by cam disks on the main driving shaft 44, in similar manner as described above for the racks 28. Each sign setting rack 96 cooperates with its sign indicator rack 97 (analogous to the rack 35) and may be coupled to its indicator rack 97 by means of a toothed coupling wheel 36a (analogous to the wheel 36). From the indicator racks 97 the motion is transmitted to sign indicator wheels (analogous to the wheels 39), in the same manner as described above for the transmission of motion from the racks 35 to the wheels 39 via the transmission 38 in Fig. 2. These parts are, therefore, not shown for the sign indicator.

At the operation of the machine the four amount setting racks 96 are moved backwards (that is: to the left in Fig. 10 or upwards in Fig. 7) in the machine in similar manner, as the amount setting racks 28 are moved. At this the racks 96 rotate the shafts 94 by means of the toothed wheels 95, until the rotation of these shafts is stopped by the fact that their projections 93 strike the rods 69 of that or those keys, which have been depressed in the rows 22—25. Thus, the racks 96 stop after a number of steps corresponding to the key depressed in the row concerned. During this motion, the racks 96 are disconnected from their sign indicator racks 97, which meanwhile return to their back position (zero position, upper position in Fig. 7). Now the toothed wheels 36a are brought into mesh (by means of a cam disk on the main shaft 44) to couple the sign setting rack 96 to its sign indicator rack 97 now in its zero position. The racks 96 are now restored to their zero position (extreme right hand position in Fig. 10) by the restoring rod 41 and consequently move their indicator racks 97 so many steps as corresponds to the setting of the racks 96, that is to the sign of the key depressed in the rows 22—25, so that the sign corresponding to the key depressed is indicated on a sign indicator wheel (one for each row of keys 22—25). At this motion also the shafts 94 are restored to their zero positions, and the keys 22—25 are released in well-known manner.

*Driving mechanism*

As shown in Figs. 5 and 6, the manually operated crank 98 drives three toothed wheels 99, 100, 101 in permanent mesh, journalled on pins secured to the right hand wall 49. The wheel 101 drives both a toothed wheel 102 secured to the main driving shaft 44 of the machine and also a toothed wheel 103, which is rigidly connnected with a toothed segment 104 and a cam disk 105.

The disk 105 cooperates with a cam disk 106 having a recess. Furthermore, the disk 106 is rigidly connected with a toothed wheel 107 secured to the tens transfer shaft 50. The parts 105, 106 form a so called Maltese cross transmission, which prevents the shaft 50 from rotating during the calculating operation effected by the rotation of the shaft 44, until the higher portion of the disk 105 is disengaged from the disk 106 and simultaneously the toothed segment 104 comes into engagement with the wheel 107 and rotates the latter one revolution for the tens transfer.

The pin carriage 27 is reset and the depressed keys 21—25 are released in well-known manner. The keys are preferably provided with locking devices so that at any time only one key in each row 21—25 can be depressed. Means for interlocking between the groups of keys may also be provided in well-known manner. For instance, a waiter's key 22 shall be locked against depression, when a bill key 25 has already been depressed, and vice versa. In addition, the machine may be provided with a printing mechanism, a check delivery mechanism, locks etc., as well-known in the art.

Setting the kind of operation

The mechanism for setting the kind of operation is shown in Figs. 13 and 14. As stated above, Z is a resetting or total taking key, while X is a reading or subtotal taking key. When no kind of operation key has been depressed, the machine is (automatically) set for addition.

The keys Z and X each cooperate with a bell crank lever 200. The levers 200 are rotatably journalled on stationary pins 201, secured to the wall 49, and are articulately connected with rods 202 (for the Z-key) and 203 (for the X-key) by means of pins 204. To the end of the rod 202 two rods 206, 207 are articulately connected by means of a pin 205.

On a stationary shaft 208 secured to the wall 49 two lever-shaped hooks 209, 210 are rotatably journalled. By means of the pin 211 the upper arm of the hook 209 is articulately connected with the rod 206, while the lower arm of the hook 210 carries a pin 212, which passes through a slot 213 of the rod 207 and also through a slot 214 of the rod 203. Between the upper arm of the hook 210 and the lower arm of the hook 209 a tension spring 215 is arranged.

On the main shaft 44 two cam disks are secured, viz. 216 for addition and 217 for resetting. On the cam disk 216 a roller 218 runs, which is journalled on a bell crank lever 219. The roller 220 journalled on a lever 221 runs on the disk 217. The levers 219, 221 are articulately connected with the rod 80 (Figs. 3, 13, 14) by means of a pin 222. A tension spring 231 normally keeps the rod 80 in its upper position.

The levers 219, 221 are rotatably journalled on pins 223, 224 respectively, and these two pins are secured to rocking arms 225, 226, respectively. These arms are journalled on a journal 227 secured to the wall 49 and have projections 228, each under the action of a spring 229. Thus, the springs 229 tend to rock the arms 225, 226 clockwise on the journal 227. The free ends of the arms 225, 226 are guided in vertical slots in a stationary metal plate 230, secured to the wall 49. The plate 230 is bent in its longitudinal direction, and its horizontal flange has guiding slots for the levers 219, 221. At their ends guided in the plate 230 the arms 225, 226 are bent at right angles, and these bent portions are in the path of motion of the hooks 209, 210, respectively.

It is obvious that when the hooks 209, 210 are not above the upper edges of the arms 225, 226, respectively, these arms and consequently also the pins 223, 224 secured thereto may be rocked, when the cam disks 216, 217 act on the levers 219, 221. These levers then rock on the pin 222 and the rod 80 stays in its upper position due to the tensional action of its spring 231, so that the levers run idly and consequently cannot bring the totalizers to engage the toothed cylinders 55a—i. But when one of these hooks 209, 210 engages its arm 225, 226, respectively, the pin 223, 224, respectively, is locked in its (operative) position in the space and consequently the lever 219, 221, respectively can now rock only on its pin thus locked. When now a cam disk 216, 217 acts on the lever 219, 220, respectively, the rod 80 is consequently pulled downwards and that or those totalizers, which have been selected, are coupled to their toothed cylinders 55a—i, as described above under the headings "Totalizer selection" and "Totalizer engaging mechanism."

Addition

If none of the kind of operation keys Z and X has been depressed, the machine is set to addition (Fig. 13). Then the hook 209 keeps the arm 225 locked, but the hook 210 does not engage the arm 226.

At the operation of the machine, the main shaft 44 with the cam disks 216, 217 is rotated in the direction of the arrow. The cam of the disk 217 has no influence on the totalizer selected, because the arm 226 rocks idly.

During the period in which the cam 217 keeps the lever 221 rocked out, draw bar 80 is affected because arm 226 is free to rock, and therefore the slides 28 are moved from their zero position to their operative positions so many steps, as corresponds to the numeral value of the amount key depressed for each denomination, and then the racks are stopped in these positions, as described above. During the continued rotation of the main shaft 44 the cam of the addition disk 216 rocks the lever 219 so that the pin 222 and consequently also the rod 80 are pulled downwards, because the pin 223 is locked by the hook 209. The selected totalizer (or totalizers) is consequently brought in mesh with the toothed cylinders 55a—i, while the racks 28 are in their operative position. Thus, while the rod 80 is kept in its lower position by the cam disk 216, the racks 28 return to their zero position in the manner described above, and then they enter the amount set into the totalizer or totalizers thus engaged. After this procedure is finished, the roller 218 runs down on the lower portion of the disk 216, and now the spring 231 again lifts the rod 80 so that the totalizer or totalizers are disengaged from the toothed cylinders 55a—i. After this tens transfer is effected and the amount is indicated.

Resetting

For resetting the key Z is depressed, which by means of the lever 200 pulls the rod 202 to the right in Figs. 13 and 14. This motion is transmitted to the hook 209 by means of the rod 206 so that the hook is disengaged from the arm 225. The same motion of the rod 202 to the right is also transmitted by the rod 207 to the pin 212, which rocks the hook 210 to engage the arm 226. (At this motion the pin 212 slides in the slot 214 of the rod 203 so that said rod is not moved.)

At the operation of the machine the disk 217 now rocks the lever 221, while the racks 28 are still in their zero position (the amount keys 21 are locked during resetting operations in well-known manner, and thus all stop pins 26 are in their inoperative positions). Because the arm 226 and its pin 224 are locked in position by the hook 210, the cam 217 rocks the lever 221 counter-clockwise on the pin 224, which is stationary during resetting operations. Consequently, the rod 80 is pulled downwards and the totalizer is caused to engage the toothed cylinders 55a—i, while the racks 28 are still in their zero position (position of rest). While the roller 220 is on the cam of the disk 217, these racks are moved (to the left in Fig. 2) out of their zero position, until they are stopped due to the fact that the tens transfer teeth 56, which are broader than the other teeth of the totalizer wheels, strike the parts 57a (Figs. 11a-c, 12) of the levers 57. This rotation of the totalizer wheels is effected counter-clockwise in Figs. 3 and 11a-c, and for this direction of rotation the levers 57 cannot be rocked aside. The position, in which the totalizer wheels are thus stopped, is their zero position, and their motion to that position from their original position, in which they were brought into engagement with the toothed cylinders 55a—i represents the numeral value, to which the totalizer wheel was set, that is the numeral value stored in the totalizer wheel. Consequently, all wheels of the totalizer are now reset, but the racks 28 are in their operative positions, corresponding to the numeral values, which were originally set (stored) in the totalizer wheels of the various denominations.

Now, the roller 220 runs down on the lower portion of the disk 217 and the rod 80 is restored to its upper position by its spring 231 so that the totalizer reset is disengaged from the toothed cylinders 55a—i. (Shortly before that moment the disk 216 rocks the lever 219, but this lever runs idly because the hook 209 is disconnected from the arm 225).

After the totalizer thus has been disengaged, the racks 28 return to their zero position, while the amount previously stored or accumulated in the totalizer and now transmitted to the racks 28 is indicated by racks 35 and wheels 39, because the racks 28 during their return motion are coupled with their indicator racks 35.

At the end of the operation of the machine the depressed resetting key Z is released in well-known manner, and returns to its position of rest under the action of a spring. Now the rod 207 releases the pin 212, and the spring 215 rocks the hook 210 out of engagement with the arm 226, while the pin 212 slides in the slot 213. Simultaneously the rod 206 rocks the hook 209 to engage the arm 225, and thus the machine is again set to addition.

Reading

For reading, the key Z is depressed, which then pulls the rod 203 to the right in Figs. 13 and 14 by means of the lever 200. This rod rocks the hook 210 by means of the pin 212 to engage the lever 226. During this rocking motion the pin 212 slides in the slot 213 of the rod 207, so that the rods 207 and 206 are not displaced; that is: the hook 209 remains in engagement with the arm 225. Consequently, the two arms 225, 226 with their pins 223, 224 are locked in their position.

Thus, the rod 80 is pulled downwards, when the cam of the resetting disk 217 moves the roller 220. When later the cam of the addition disk 216 moves the roller 218, the lever 219 is rocked and prevents the rod 80 from the being restored to its upper position. Consequently, the totalizer remains connected also during the period, in which the cam of the disk 216 engages the roller 218. In other words: the totalizer is first reset, as described above under the heading "Resetting," but then the totalizer is not disengaged, but during the return motion of the racks 28 to their zero position the amount is again transmitted from these racks into the totalizer, as described above under the heading "Addition." The amount is indicated by the indicator wheels 39. Consequently, reading or sub-total-taking is a combination of resetting and addition procedures.

The modification may be made that the members 76 to be set by the keys 22, 25 are journalled on the projections 83. When these members 76 have been set into operative position by means of their keys, they are actuated by the rocking cradle, when the latter is rocked at the operation of the machine so that the disk 51 are rocked into engaged position.

What I claim:

In a machine of the class described, in combination, a rotatable shaft, a disk rockable on said shaft, parallel journals arranged along a circular curve on said disk, said curve being concentric with said shaft, toothed wheels rotatable on said journals to form a totalizer, actuators for said wheels, articulately connected tens transfer arms intermediate each successive denomination of the totalizers journalled on said disks, a projection rotatable with said shaft, and tens transfer teeth on said wheels for moving said arms into transfer initiating positions in the path of rotation of said projection, whereby tens transfers are effected by said projection upon rotation of said shaft.

VIGO WALDEMAR LINDSTEIN.